(No Model.)   12 Sheets—Sheet 3.

S. E. McGREGORY.
BRICK MACHINE.

No. 362,102.   Patented May 3, 1887.

Witnesses:
N. B. Anderson
J. W. Hoke.

Inventor:
Samuel E. McGregory
by C. D. Moody, atty (No Model.)

S. E. McGREGORY.
BRICK MACHINE.

No. 362,102. Patented May 3, 1887.

Witnesses:
N. C. Anderson
J. W. Hoke.

Inventor:
Samuel E. McGregory
by C. D. Moody atty (No Model.)  12 Sheets—Sheet 5.

S. E. McGREGORY.
BRICK MACHINE.

No. 362,102.  Patented May 3, 1887.

Witnesses:
J. W. Hoke.
B. J. Rex

Inventor:
Samuel E. McGregory
by C. D. Moody
atty (No Model.) 12 Sheets—Sheet 7.

S. E. McGREGORY.
BRICK MACHINE.

No. 362,102. Patented May 3, 1887.

Witnesses:
N. B. Anderson
T. W. Hoke.

Inventor:
Samuel E. McGregory
by C. D. Moody atty

(No Model.)   S. E. McGREGORY.   12 Sheets—Sheet 9.
BRICK MACHINE.
No. 362,102.   Patented May 3, 1887.

Witnesses:
N. B. Anderson.
J. W. Hoke.

Inventor:
Samuel E. McGregory
by C. D. Moody
atty

(No Model.) 12 Sheets—Sheet 11.

S. E. McGREGORY.
BRICK MACHINE.

No. 362,102. Patented May 3, 1887.

Witnesses:
N. B. Anderson
J. W. Hoke.

Inventor:
Samuel E. McGregory
by C. P. Moody
atty (No Model.) 12 Sheets—Sheet 12.

S. E. McGREGORY.
BRICK MACHINE.

No. 362,102. Patented May 3, 1887.

Witnesses:
J. B. Anderson
J. W. Hoke.

Inventor:
Samuel E. McGregory
by C. D. Moody, atty

UNITED STATES PATENT OFFICE.

SAMUEL E. McGREGORY, OF ST. LOUIS, MISSOURI.

BRICK-MACHINE.

SPECIFICATION forming part of Letters Patent No. 362,102, dated May 3, 1887.

Application filed May 4, 1886. Serial No. 201,107. (No model.)

*To all whom it may concern:*

Be it known that I, SAMUEL E. MCGREGORY, of St. Louis, Missouri, have made a new and useful Improvement in Brick-Machines, of which the following is a full, clear, and exact description.

Certain features of the improvement about to be described are applicable to various forms of brick-machines. The improvement, however, relates mainly to hydraulic brick-machines, and it is in connection with that type of brick-machine that the improvement is illustrated.

The improvement consists, first, in the means employed to facilitate the downward movement of the lower plunger; second, in the cushioning of the downward movement of the lower plunger; third, in the mode of opening and closing the exhaust-valve for the upper chamber; fourth, in the mode of regulating the amount of clay delivered into the molds; fifth, in the mode of attaching the plunger and dust-shield to the piston of the hydraulic cylinder; sixth, in the mode of constructing the mold-frame and the mode of holding the mold in the frame of the press; seventh, in the means for preventing the delivery of the clay into the molds in the event the plungers fail to act; eighth, in the means for opening and closing the high and low pressure inlet-valves for the upper and lower chambers of the hydraulic cylinder; ninth, in the means for opening the exhaust-valve of the lower chamber of the hydraulic cylinder; tenth, in the means for tripping the exhaust and momentarily relieving the pressure upon the toggle as its arms are being moved from a perpendicular position; eleventh, in the mode of balancing the high and low pressure valves for the hydraulic cylinder; twelfth, in the means for determining the distance between the plungers as they approach each other and for making the lower plunger assist in lifting the upper plunger and protecting the brick from being crushed while being delivered from the mold; thirteenth, in the mode of constructing the molds for ornamental brick.

The annexed drawings, making part of this specification, are of such portions of a hydraulic brick-machine as are necessary to an understanding of the present improvement.

The same letters of reference denote the same parts.

The frame-work, as well as many of the working parts of the machine, being such as substantially exhibited in hydraulic brick-machines—such, for instance, as described in Letters Patent granted McGregory and Koch December 22, 1885, No. 332,814—it is not deemed necessary in the present specification to describe any but those parts of the construction with which the present improvement is immediately connected.

Figures 6, 7, 8:
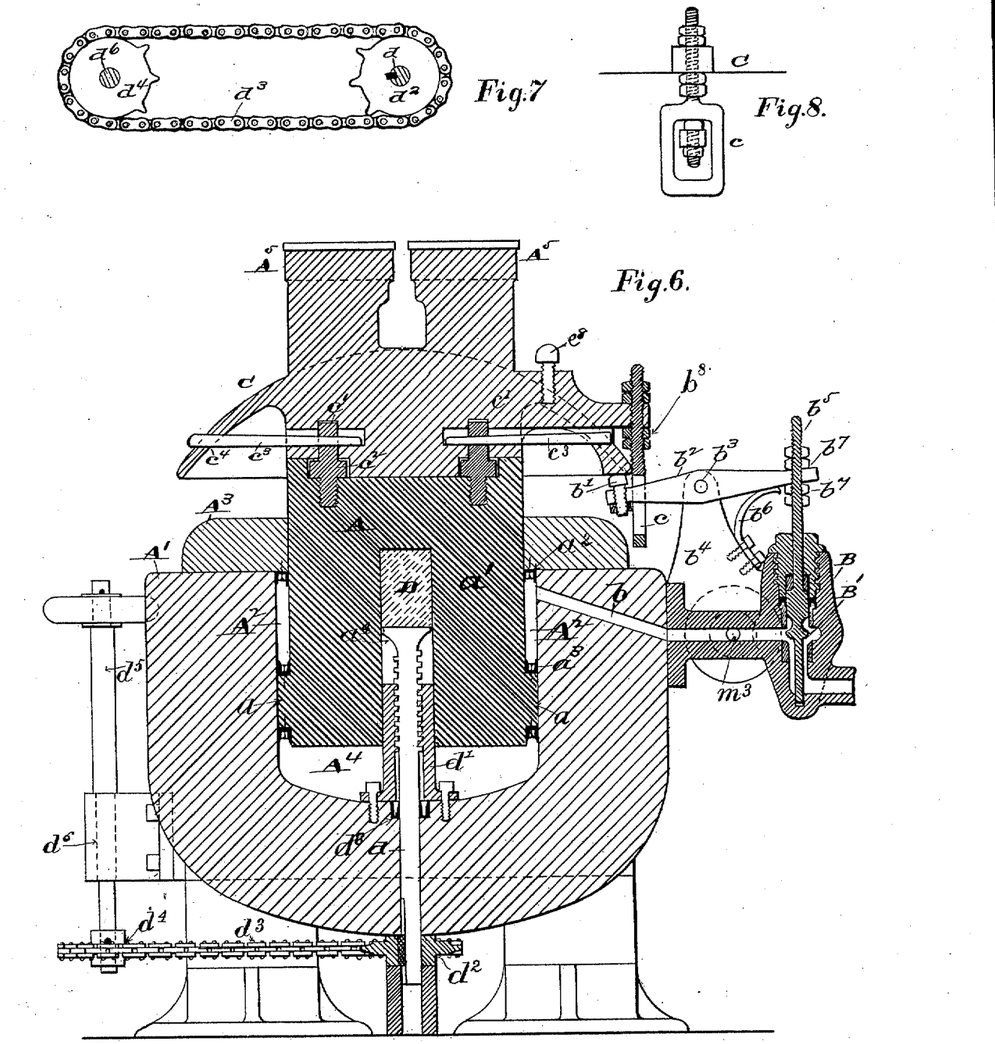
Fig. 6 is a vertical section of the lower or hydraulic plunger and the parts therewith immediately connected.
Fig. 7 is a plan of the chain belt and sprocket-wheels used in adjusting the lower plunger.
Fig. 8 is a detail, being a side elevation of the loop upon the dust-protector for engaging the exhaust-valve-stem lever.

A, Fig. 6, represents the lower plunger of the press, and A' represents the cylinder in which the plunger works. This plunger is moved upward by hydraulic pressure in the usual manner; but in the place of relying upon the force of gravity to restore it to its original position, as hitherto has been customary, the downward movement of the plunger is accelerated by the application of hydraulic force. To this end the plunger at a point above its lower end is made smaller in diameter than at its lower end, $a$, for the purpose of forming an annular chamber, $A^2$, which extends around the narrower portion, $a'$, of the plunger and above the larger portion, $a$, of the plunger. Water under pressure is let into this chamber by means of a valvular system, hereinafter described, and by reason of such introduction the plunger is forced downward in the cylinder A' more rapidly than when it is allowed to drop by its own weight. The water-pressure at the upper end of the chamber $A^2$ is confined by the ring $A^3$ and packing $a^2$, and at the lower end of the chamber the water-pressure upon the portion $a$ of the plunger and the packing $a^3$ prevents the escape of the water past the portion $a$. At the same time the water in the chamber $A^4$ beneath the plunger is exhausted rapidly, by reason of the accelerated downward movement of the plunger, as described. The upward and downward movement of the plunger A is utilized for opening and closing the exhaust-valve for the chamber $A^2$. The valve-chamber B of this exhaust-valve B' is attached to the cylinder A', and the water is admitted to the chamber $A^2$ through the passage $b$. The water is also exhausted from the chamber $A^2$ through the same passage. The inverted-bowl-shaped part or dust-protector C for the plunger A, and which is attached to the plunger in the manner hereinafter described, just before the plunger in its downward movement reaches its lowest limit, strikes the set-screw $b'$, which is screwed into the inner end of the lever $b^2$. This lever is pivoted at $b^3$ to a suitable bearing, $b^4$, and its outer end is connected with the stem $b^5$ of the valve B'. A spring, $b^6$, acts to lift the outer end of the lever $b^2$, and thereby to unseat the valve B' and to hold it unseated until the loop $c$, that is attached to the protector C, by reason of the upward movement of the lower plunger, engages the inner end of the lever $b^2$. The inner end of the lever is then drawn upward against the action of the spring $b^6$ and the valve B' is seated, and the loop holds it seated while the charger goes forward, and at the end of its stroke the inlet-valve for the upper chamber, $A^2$, opens by the action of a toe or lever, $m$, Fig. 2, upon the charger rock-shaft $m'$, and admits the water into the upper chamber, $A^2$, through the side pipe, $m^3$, Figs. 2, 3, and 6, and passage-way $b$. As soon as this same water-pressure reaches and acts upon the exhaust-valve B', it holds that valve seated against the action of the spring $b^6$, and as the plunger moves downward the loop $c$ releases the lever $b^2$, and the water-pressure alone holds the exhaust-valve B' down until it is again raised by the downward action of the plunger engaging the set-screw $b'$.

To enable the seating and unseating of the valve B' to be accurately effected, the mechanism for operating the valve is made adjustable at several points. The set-screw $b'$ can be screwed more or less into the inner end of the lever $b^2$. The outer end of the lever $b^2$ is connected with the valve-stem $b^5$ by means of the nuts $b^7$, and by adjusting these nuts upward and downward upon the valve-stem the point of connection of the lever $b^2$ therewith can be fixed as desired, and by means of the nuts $b^8$ the loop $c$ can be adjusted vertically upon the protector C, and the loop $c$ and lever $b^2$ thereby relatively adjusted. Provision is made for cushioning the downward movement of the plunger. The plunger A is chambered out at $a^4$ to receive a spring of rubber or metal, D, which is upheld within the chamber $a^4$ by means of a screw, $d$. This screw is adapted to work in the stationary nut $d'$, which in turn is fastened to the cylinder A'. The screw extends downward through the nut, and also through the bottom of the cylinder A', and beneath the cylinder the screw has attached to it a sprocket-wheel, $d^2$. A chain, $d^3$, leads from the sprocket-wheel $d^2$ around the sprocket-wheel $d^4$ upon the shaft $d^5$, which is held and adapted to be rotated in the bearing $d^6$. The piston A, when at the lower limit of its stroke, rests upon the spring D, and the spring in turn, as stated, rests upon the screw $d$. By rotating the shaft $d^5$ the screw $d$ is raised or lowered, according to the direction in which the shaft is turned. By this means the plunger, so far as the lower limit of its stroke is concerned, can be readily adjusted vertically. The joint around the screw $d$ is packed by means of the packing $d^5$. The spring D might be placed beneath the cylinder at the lower end of the screw $d$. The mechanism last above described is used for regulating the amount of clay received into the molds, for, by adjusting the mechanism so that the plunger can move farther downward in the cylinder A', the sub-plungers $A^5$, which respectively form the bottoms of the molds, are withdrawn to a lower level in the molds, and the capacity of the molds is thereby increased, and by terminating the downward movement of the plunger A at a higher level the capacity of the molds is correspondingly diminished.

In forming the upper chamber, $A^2$, in the cylinder A', it becomes necessary to use a cylinder-head, such as the ring $A^3$. This ring is put on over the smaller end of the plunger A. This requires the dust-protector C, which is connected with the sub-plungers, to be made in a separate piece from the plunger A, and the dust-protector C is secured to the plunger A in the following manner: Two stud-bolts, $c'$, are screwed into the top of the plunger A, for which purpose the stud-bolts are provided with a squared collar, $c^2$, to which a wrench can be applied. The upper end of the stud-bolt is slotted to admit a key, $c^3$, which, after the stud-bolt is fixed in the plunger, is passed through a perforation, $c^4$, in the flange of the protector C, and then through the stud-bolt, substantially as shown in Fig. 6. The protector C, which supports the sub-plungers, is laterally adjusted upon the plunger A, and, by the means described, is secured vertically thereto.

Figure 9:
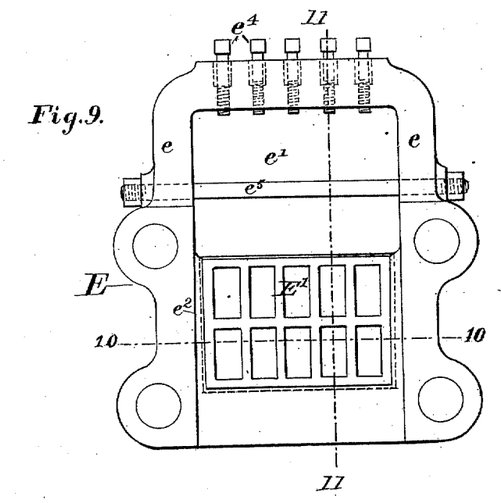
Fig. 9 is a plan of the mold and mold-frame, the mold being in position, but the fastening-block being removed.
Figure 10:
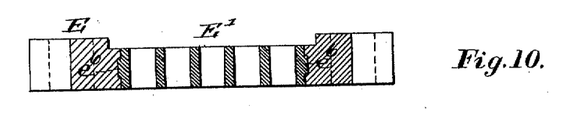
Fig. 10 is a section on the line 10 10 of Fig. 9.
Figure 11:
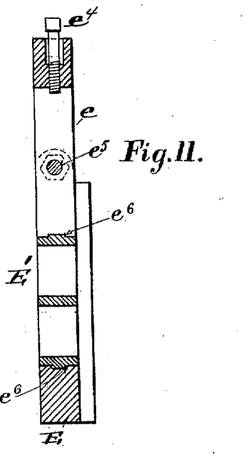
Fig. 11 is a section on the line 11 11 of Fig. 9.
Figure 12:
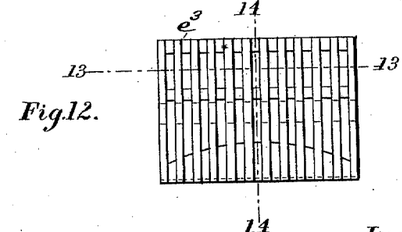
Fig. 12 is a plan of the block used in holding the mold in the mold-frame.
Figure 13:
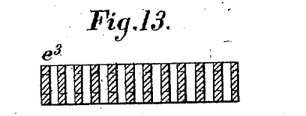
Fig. 13 is a vertical section on the line 13 13 of Fig. 12.
Figure 14:
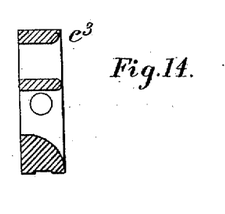
Fig. 14 is a vertical section on the line 14 14 of Fig. 12.

The construction of the mold-frame will now be described. Referring to Figs. 9, 10, 11, E represents the mold-frame, which is made in one piece. Its sides $e$ are extended far enough to the front of the machine to leave an opening, $e'$, in front of the position occupied by the molds E' when in use, a little larger than the molds. This enables the molds, when it is desired to remove them from the machine, to be slipped horizontally forward in the mold-frame into the space $e'$, whence the molds can be removed by lifting them out of the mold-frame.

Figures 15, 16, 17:
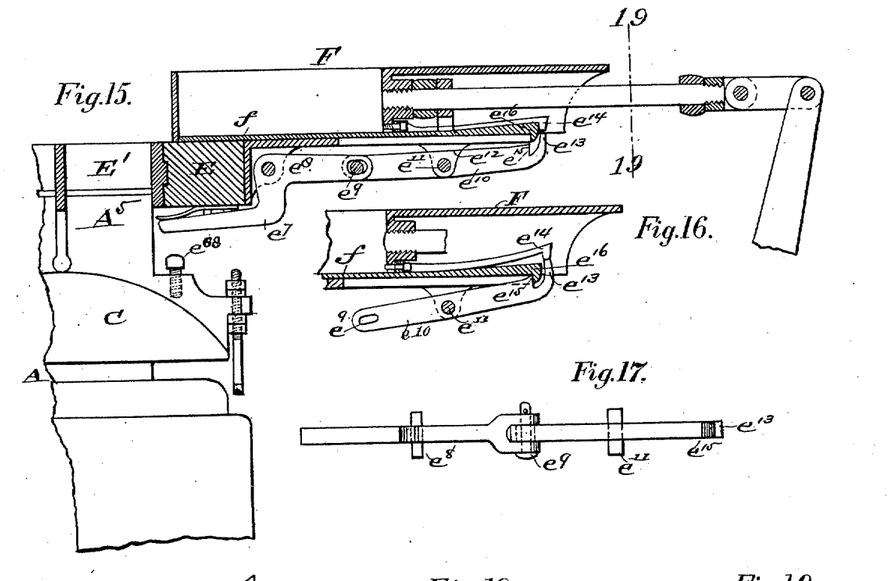
Fig. 15 is a vertical section of the charger. The lower plunger and parts therewith connected are shown in side elevation.
Fig. 16 shows the parts of Fig. 15 in a different position, the charger-bottom being unlatched from the charger.
Fig. 17 is a plan of the charger-bottom-latch mechanism.
Figure 18:
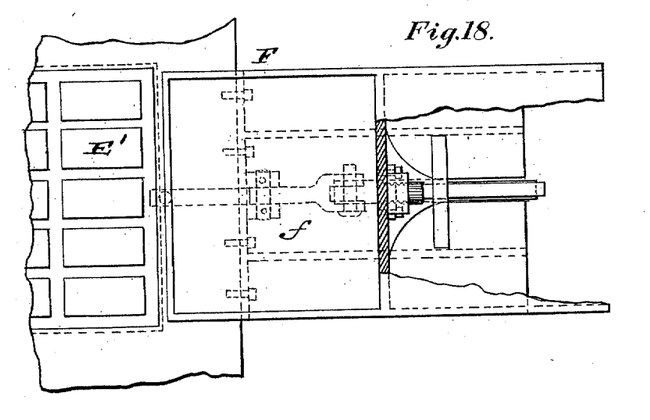
Fig. 18 is a plan of the charger, a portion of the top being broken away.
Figure 19:
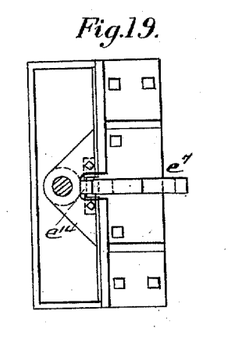
Fig. 19 is a vertical section on the line 19 19 of Fig. 15.

The molds are placed and held in the mold-frame by first dropping them into the space $e'$ in the mold-frame, then slipping them horizontally rearwardly into their proper place $e^2$ in the mold-frame, and then fastening them in position by means of the block $e^3$, which is inserted in the space $e'$ in front of the molds and made to bear against the molds, so as to tighten them in place by means of the screws $e^4$, which are screwed through the mold-frame against the front edge of the block $e^3$. The block $e^3$ is preferably in the form of a grating, as shown. The bolt $e^5$, which passes transversely through the grating and mold-frame, serves to keep the parts from spreading. The molds have a projection, $e^6$, which extends around the molds and fits into a corresponding groove in the mold-frame and grating. The mold-frame also tapers slightly rearwardly, so that when it is forced backward to its place in the manner described it will be wedged tightly in its bearing in the mold-frame. In all brick presses or machines where the two plungers are respectively actuated by independent powers—for instance, in such a machine as is described in McGregory and Koch's patent, No. 332,814—there is a possibility of one of the powers failing to act properly. If, for instance, the pump fails to act and the mechanical power continues to act and to deliver the clay into the molds, and the mechanically-actuated plunger continues to perform its duties, the clay in the molds will become so compacted as to prevent the mechanical power from forcing the plunger belonging to that power to the desired depth in the molds. In this event some part of the apparatus must break. To obviate this difficulty I have contrived a movable bottom for the charger F, Figs. 15, 16, which supplies the clay to the molds. This bottom $f$ remains firmly attached in its place in the charger until the hydraulic plunger A reaches a proper height, whereupon the plunger, or some part thereto attached, encounters and operates a latch, and thereby detaches the charger-bottom $f$ from the main portion of the charger and causes it to be kept from moving with the charger to be retained when that part is moved forward with its charge of clay. In Fig. 15 the sub-plungers of the plunger A are shown partly entered into the molds E'. $e^7$ represents a lever pivoted at $e^8$ to a bracket on the outside of the mold-frame.

The protector C of the lower plunger, A, is provided with a projection in which is a vertically-adjusted screw, $e^8$. Just before the lower sub-plungers reach the level of the delivery-table the screw $e^8$ encounters and lifts the inner end of the lever $e^7$. The outer end of the lever $e^7$ has a slotted connection, $e^9$, with the latch $e^{10}$. The latch is pivoted at $e^{11}$ to the bracket $e^{12}$, and the lifting of the inner end of the lever $e^7$ causes the outer end, $e^{13}$, of the latch to rise and to lift the outer end of a spring-hook, $e^{14}$, and at the same time, and by means of the shoulder $e^{15}$, to engage the fixed hook $e^{16}$, which is fastened to the charger-bottom $f$.

The effect of the movement is to disengage the spring-hook from the fixed hook, so that it can pass over the fixed hook. Now, should the lower plunger, from any cause, fail to rise to its appointed limit, the bottom $f$ will remain latched to the main part of the charger and will move forward with it, and in consequence no clay will be delivered into the molds; but, on the other hand, when the lower plunger does rise properly, the spring-hook is disengaged from the fixed hook, and the fixed hook and bottom are held by the latch, and the charger now moves forward over and from off the now stationary bottom $f$, and the clay is deposited in the molds in the usual manner.

The mechanism for opening and closing the high and low pressure inlet-valves for the hydraulic cylinder A' will now be described. This mechanism is shown more distinctly in Figs. 20, 22, 23.

G represents a circular plate fastened to the cam or main shaft $g$. Two curved plates, $g'$ $g^2$, are fastened to the plate G at its periphery.

Figures 20, 21, 22, 23, 24, 25:
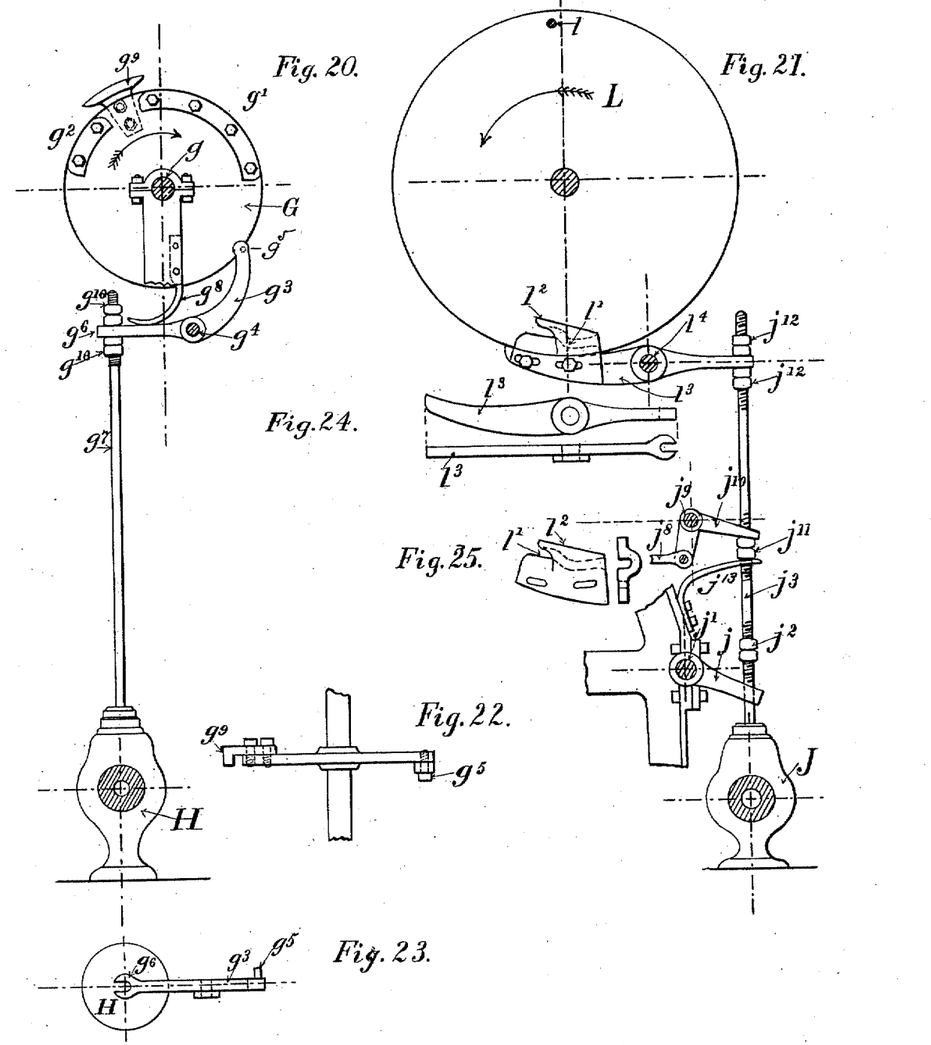
Fig. 20 is a side elevation of the mechanism for opening and closing the main inlet-valve.
Fig. 21 is a side elevation for opening and closing the main exhaust-valve.
Fig. 22 is an edge view of the disk shown in Fig. 20.
Fig. 23 is a plan of the lever used in operating the main inlet-valve stem.
Figs. 24, 25 are details, being various views of parts of the mechanism shown in Fig. 21.

$g^3$ represents a lever pivoted to a bearing, $g^4$. One end of the lever $g^3$ is provided with a pin, $g^5$, which pin is designed to rest against the edge of plate G to keep it from moving too far in that direction, while the spring $g^8$ keeps it from moving in the opposite direction. The outer end of lever $g^3$ is rounded and comes in contact with the plates $g'$ and $g^2$. The other end, $g^6$, of the lever is forked to engage with the stem $g^7$ of the main inlet-valve H, the form of which inlet-valve is shown in Figs. 22 and 23. A spring, $g^8$, Fig. 20, acts to depress the end $g^6$ of the lever $g^3$ and to seat the main inlet-valve, saving when the curved plates $g'$ $g^2$ are in the rotation of the plate G made to bear against the end of the lever $g^3$. The valve remains unseated until the first curved plate, $g'$, has passed the outer end of the lever $g^3$, whereupon the valve is momentarily seated, after which it is unseated again by means of the second curved plate, $g^2$.

The purpose of closing the valve momentarily, as described, is to facilitate the releasing from a perpendicular position the toggle used in operating the upper plunger.

The plate G is provided with a part, $g^9$, whose shape is understood by reference to Figs. 20 and 22, and whose function is to insure the seating of the main inlet-valve at the time when the pin $g^5$ of the lever $g^3$ is opposite the interval between the curved plates $g'$ $g^2$, during which the part $g^9$ presses against the pin $g^5$ and holds it back to its place against the cam-plate G. The curved plates $g' g^2$ are made adjustable upon the plate G, so that they can be set around thereon to cause them to act upon the lever $g^3$ at the proper time. The connection between the lever $g^3$ and the main inlet-valve stem is also, by means of the nuts $g^{10}$, made an adjustable one.

Figure 1:
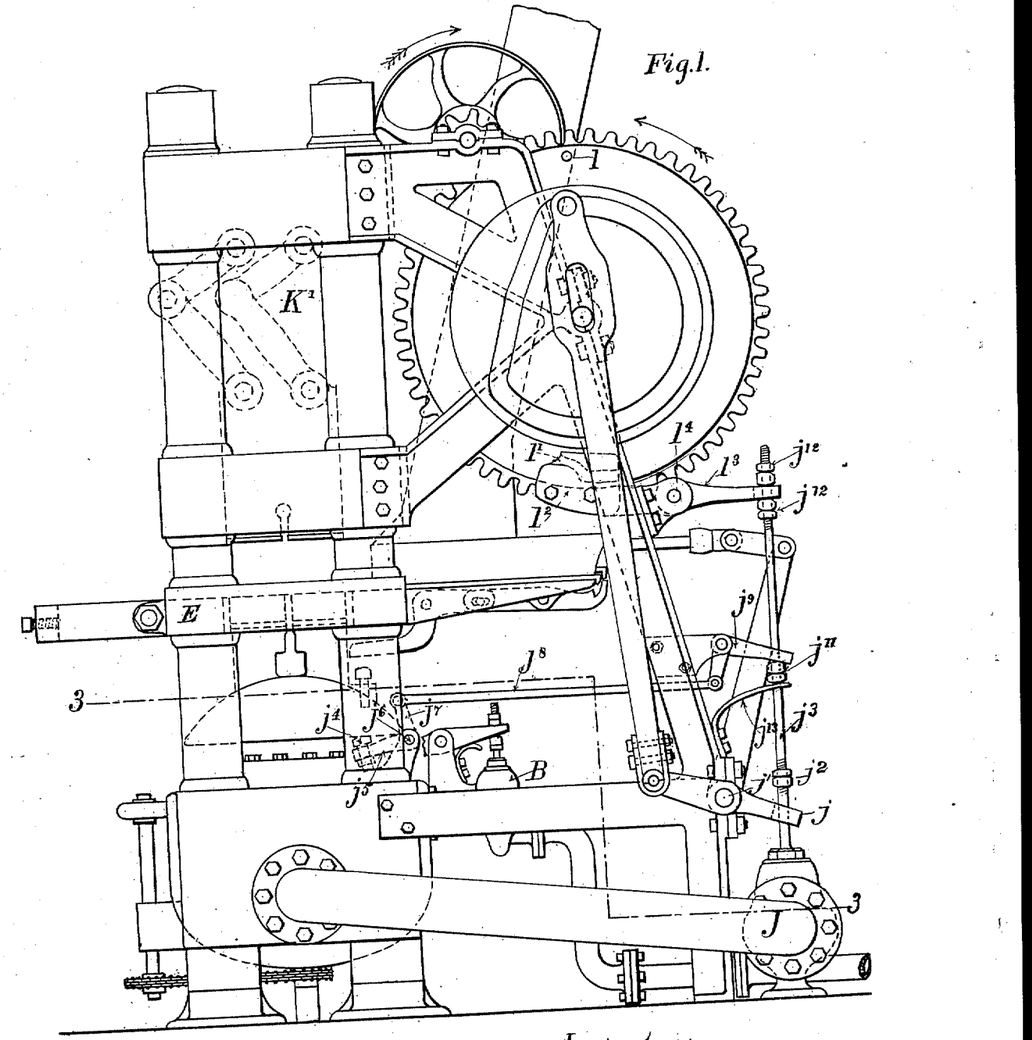
Figure 1 is a side elevation of the machine.
Figure 2:
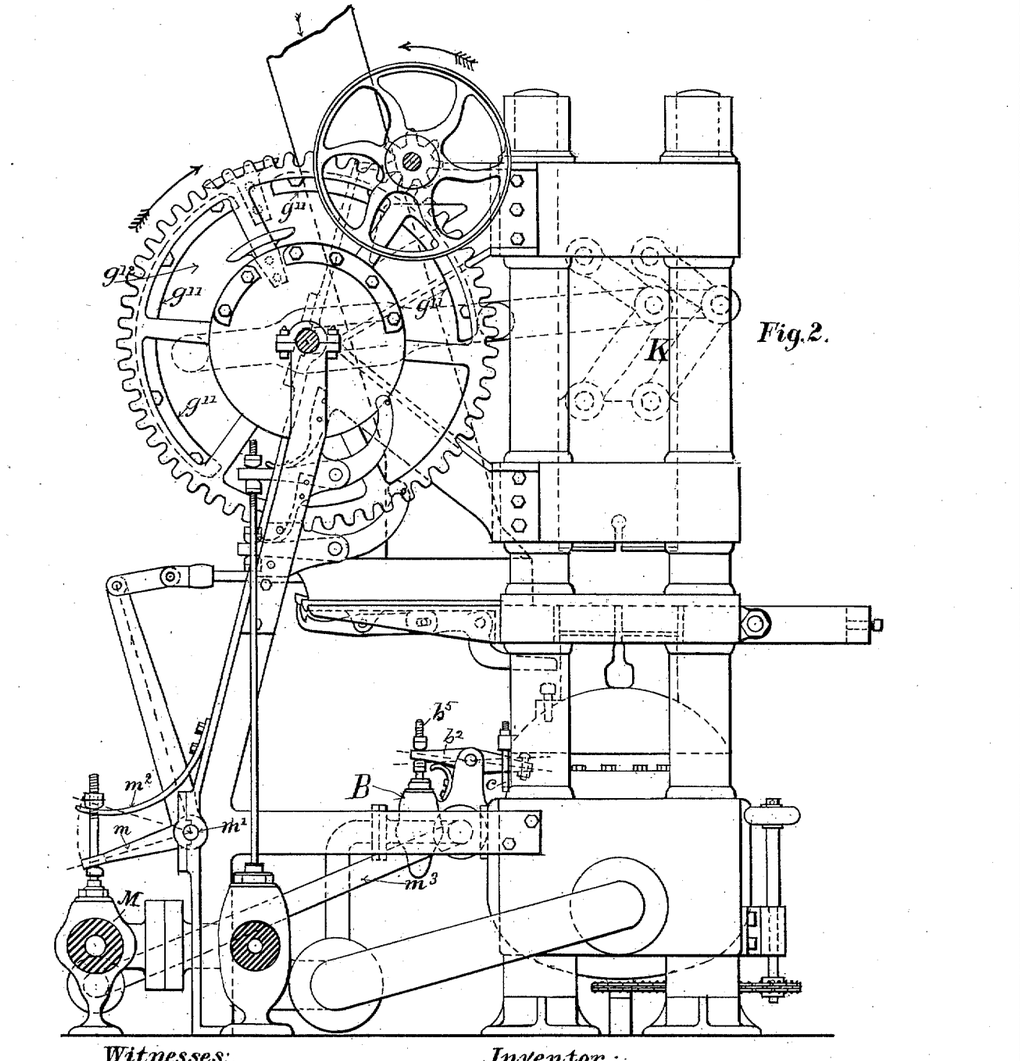
Fig. 2 is a side elevation looking at the opposite side to that shown in Fig. 1.
Figure 3:
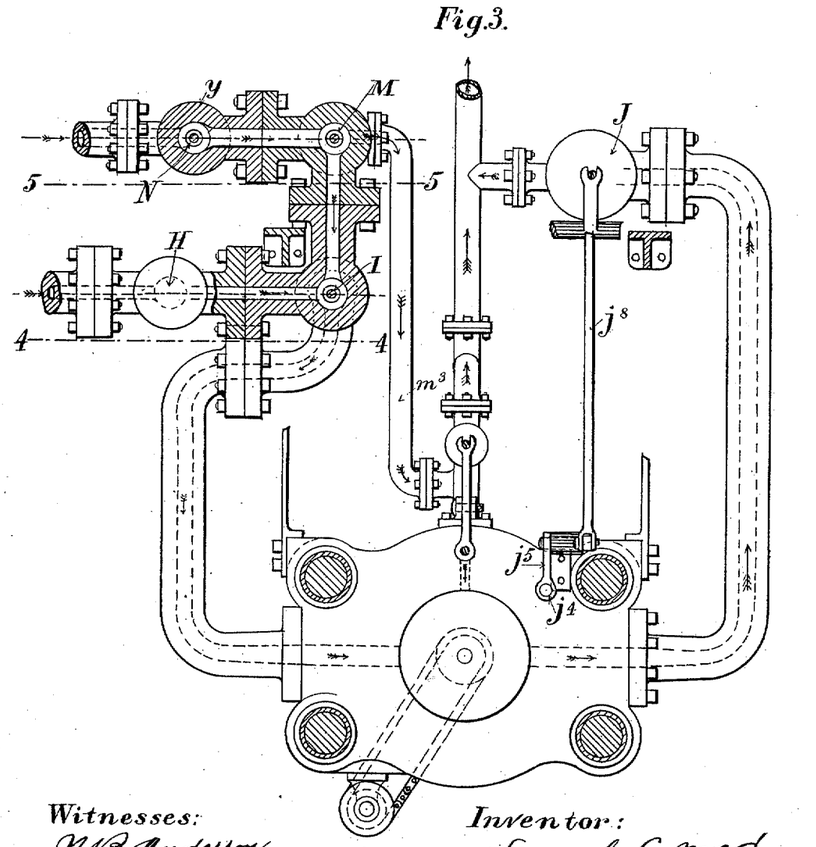
Fig. 3 is a horizontal section on line 3 3 of Fig. 1.
Figure 4:
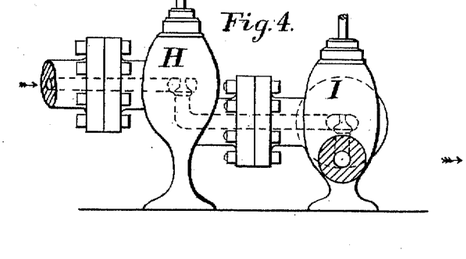
Fig. 4 is a vertical section on the line 4 4 of Fig. 3.

The device for opening and closing the main inlet-valve I, Fig. 3, for the low pressure is substantially the same as that just described for operating the main high-pressure inlet-valve, saving that the low-pressure cam-plates $g^{11}$ (partially shown in Fig. 2) are bolted to the main cam-plate $g^{12}$ for working the toggle K, Figs. 1, 2, in the place of a separate plate, as in the case of the high-pressure construction just described.

The opening of the exhaust-valve J, Fig. 21, for the lower chamber, $A^4$, of the cylinder A' is accomplished by means of a lever, $j$, Fig. 21, upon the charger rock-shaft $j'$. When the charger has nearly reached the limit of its forward movement, the lever $j$ engages the shoulder (preferably in the form of the set-nut $j^2$) of the valve-stem $j^3$, and thereby lifts the exhaust-valve J, whereupon the plunger A falls. When near the lower end of its stroke, the dust-protector C strikes the set-screw $j^4$, Figs. 1, 3, upon the arm $j^5$ of the bell-crank $j^6$. The other arm, $j^7$, of this bell-crank, by means of the rod $j^8$, connects with another bell-crank, $j^9$, Figs. 1, 21. The arm $j^{10}$ of this last-named bell-crank is forked and bears upon the set-nuts $j^{11}$ on the stem $j^3$ of the exhaust-valve J, and operates to depress the valve-stem and seat the valve and keep it seated until the pressure from the cylinder A' again comes upon it, which acts to keep the valve closed until it is again opened temporarily by the lever $l^3$, Fig. 21. The spring $j^{13}$, Fig. 1, is only sufficiently strong to sustain the weight of the valve-stem $j^3$ and the parts thereto attached for tripping the exhaust-valve and momentarily relieving the pressure upon the toggle K, Figs. 1, 2, when it is being pushed by the cams that operate the toggle, and which are not shown, from a perpendicular position.

Figure 5:
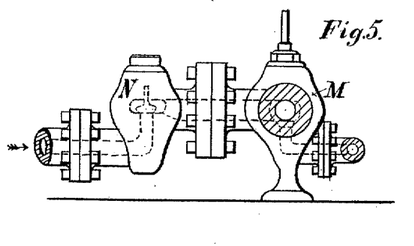
Fig. 5 is a vertical section on the line 5 5 of Fig. 3.

There is inserted in the right hand cam-plate I a pin, $l$, Figs. 1 and 21, which in the rotation of the cam-plate enters a groove, $l'$, in a plate, $l^2$, which is bolted to a lever, $l^3$. This last-named lever is pivoted to a bearing, $l^4$, and when the pin $l$ passes through the groove $l'$, the inner end of the lever $l^3$ is borne downward for a short time, after which it rises again to its former position. This movement of the lever $l^3$ in turn causes the valve-stem $j^3$ to be lifted, whereupon the water-pressure is momentarily relieved in the chamber $A^4$, while the toggle is released from a perpendicular position. The plate $l^2$ is adjustable upon the lever $l^3$, for the purpose of regulating the time for unseating the exhaust-valve. The connection between the lever $l^3$ and the valve-stem $j^3$ is also made adjustable vertically by means of the nuts $j^{12}$, Figs. 1 and 21. The inlet-valve M, Fig. 3, for the upper chamber, $A^2$, of the cylinder A', Fig. 6, is opened at the same time that the exhaust-valve for the lower chamber, $A^4$, is opened, and by means of a lever, $m$, on the charger rock-shaft $m'$, Fig. 2, similar to the one that opens the exhaust-valve J, Figs. 1 and 3, and it is kept open by means of the spring $m^2$, Fig. 2, until it is closed by the return of the lever $m$. The pressure upon the valve M will keep it closed until the lever $m$ opens it again. The water is admitted through the pipe $m^3$, Figs. 2 and 3. Between this inlet-valve M and the low-pressure accumulator (not shown) is a check-valve, N, Figs. 3 and 5, which is closed by opening the high-pressure inlet-valve H, and kept closed until the high pressure is shut off. Two accumulators are employed, one for the high pressure and one for the low pressure. There is a pump for each accumulator, the high-pressure accumulator being weighted at four thousand pounds per square inch, and the low-pressure accumulator being weighted at two hundred pounds per square inch. The high pressure is used only for the finishing pressing. The pumps deliver into the accumulator, and are working continually, storing up the water at the required pressure, so that the moment the valves are opened the plunger A works without waiting for the pumps to get up the required pressures. A general plan is provided for the inlet-valves, of which there are three, one high-pressure and two low-pressure inlet-valves. The construction of these valves is shown in Figs. 26 and 27. H represents a balanced valve. When seated, the pressure upward and downward upon the valve is the same, the areas of the top $h$ and the bottom $h'$ being equal. The arrows show the direction of the water-current. In lifting the valve it is only necessary to overcome the friction and the weight of the valve and valve-stem; but as soon as the valve leaves its seat the pressure is transferred to the under side of the valve and it rises with great force. Its movement is cushioned by means of the rubber $h^2$. The pressure is immediately transferred through the passages $h^3$ $h^4$ to the annular chamber $h^5$, and thence through the openings $h^6$ into the chamber $h^7$ above the valve, and the valve is again balanced ready to be pushed downward again.

Figures 26, 27:
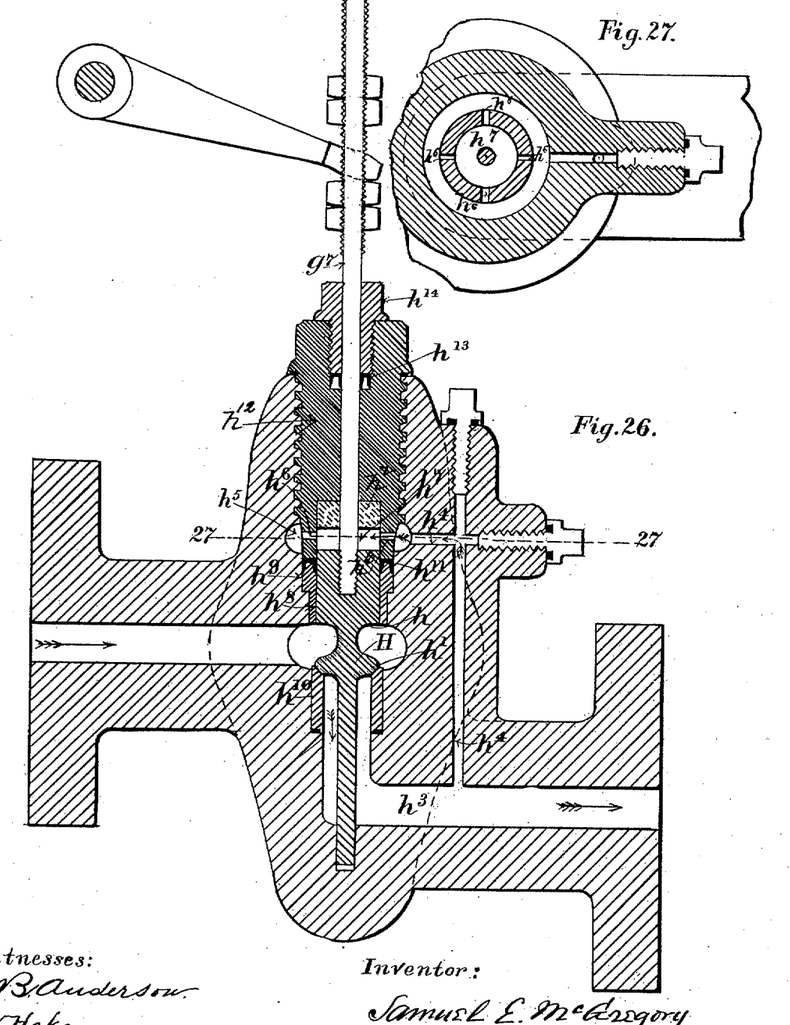
Fig. 26 is a vertical section, upon an enlarged scale, of either the main or the small inlet-valve.
Fig. 27 is a horizontal section on the line 27 27 of Fig. 26.
Figure 28:
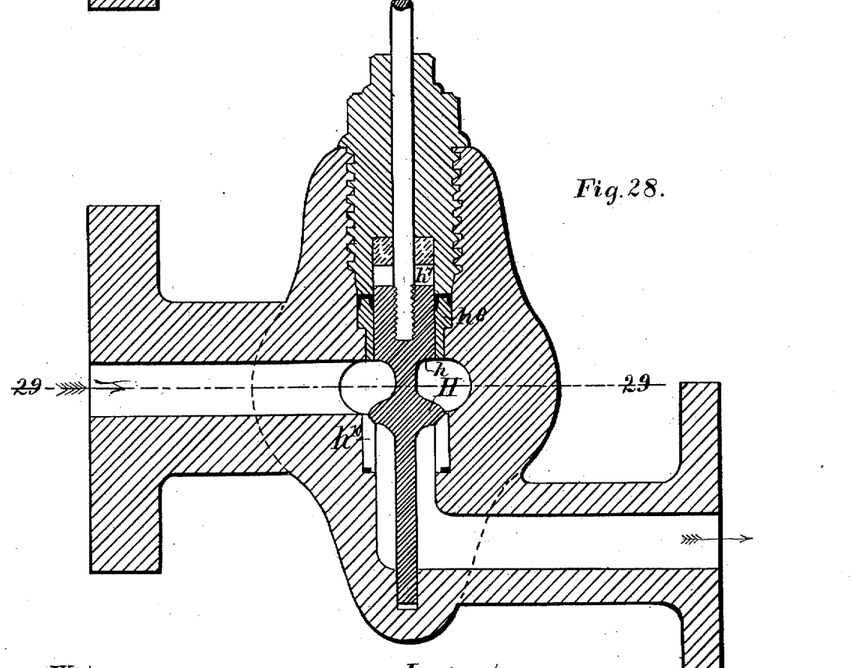
Fig. 28 is a vertical section of either one of the exhaust-valves.
Figure 29:
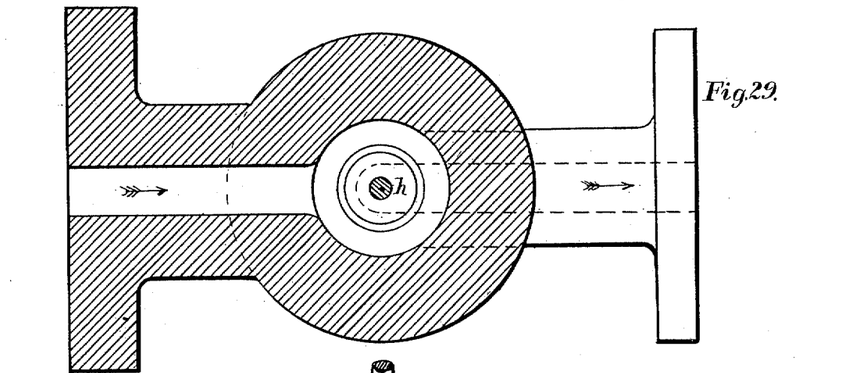
Fig. 29 is a horizontal section on the line 29 29 of Fig. 28.
Figure 30:
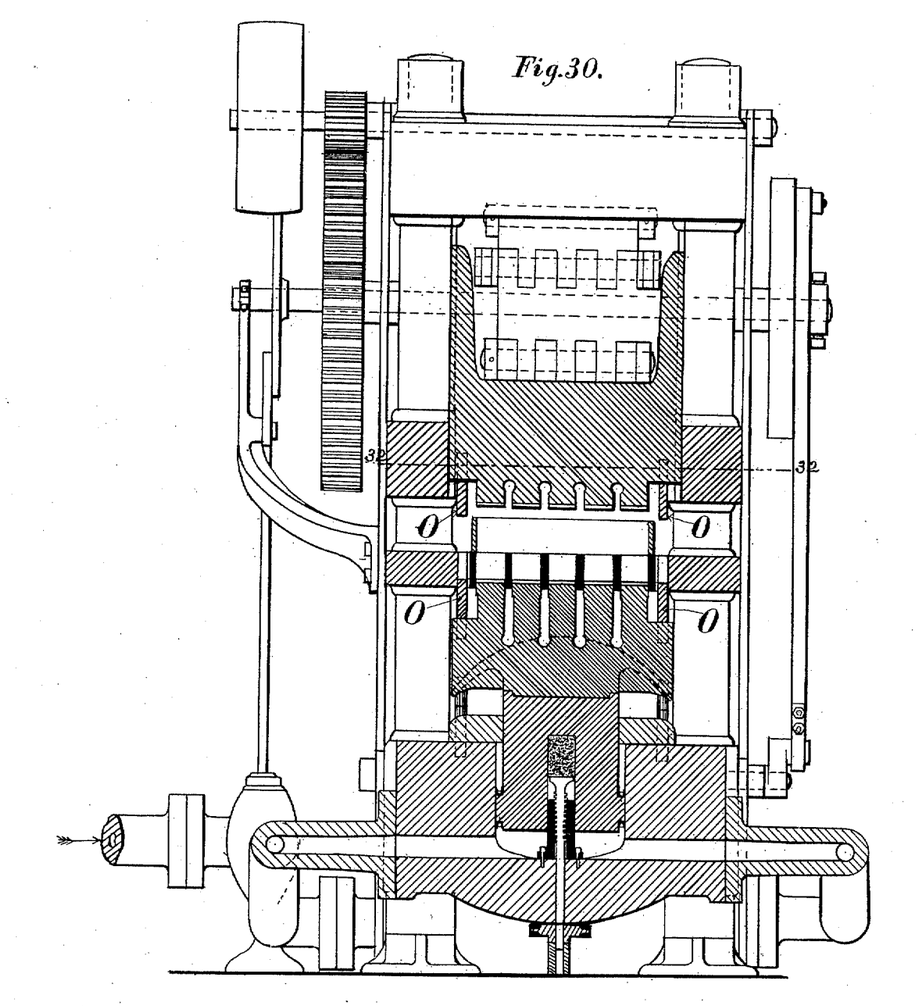
Fig. 30 is a vertical transverse section of the machine.
Figures 31, 32, 33, 34:
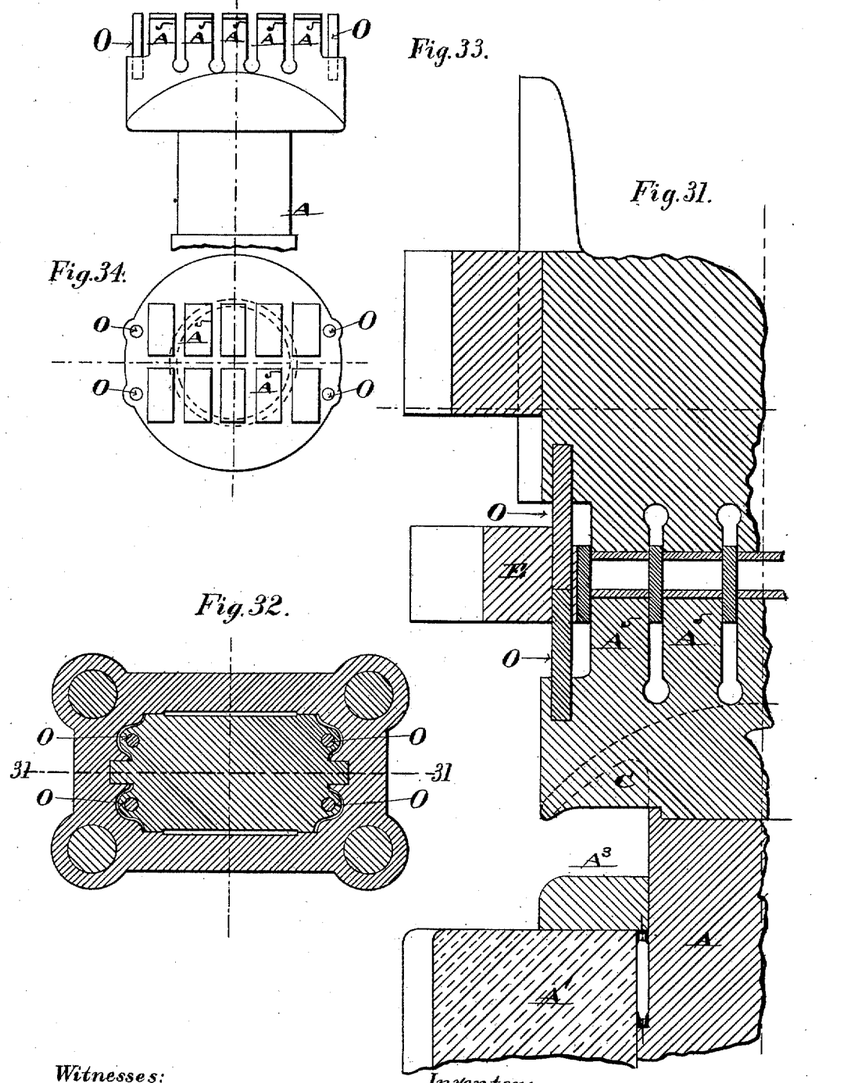
Fig. 31 is a vertical section, upon an enlarged scale, on the line 31 31 of Fig. 32, of the sub-plungers of the upper and lower plungers, respectively. The view includes a portion of the adjacent construction.
Fig. 32 is a horizontal section on the line 32 32 of Fig. 30.
Figs. 33 and 34 are respectively a side elevation and plan of the upper end of the lower plunger.

$h^8$, Fig. 26, is a ring fitted into the opening $h^9$ in the valve-chamber shell. The opening is made large enough for the bronze valve-seat $h^{10}$ to pass through to its place, as shown. The packing $h^{11}$ rests upon the top of the ring $h^8$, and it is held down thereupon by means of the plug $h^{12}$, which is screwed into the valve-chamber, as shown. The perforations $h^6$ are in the lower end of the plug $h^{12}$. The valve-stem $g^1$ works through the plug $h^{12}$, and it is packed by means of the packing $h^{13}$ and plug $h^{14}$, all of which, for the purpose in view, is the most approved construction I know of. The exhaust-valves B' and J, Figs. 1, 2, 3, and 6, are two in number, and are of the general construction shown in Figs. 28, 29. The construction is simpler than that of the inlet-valve, the relief-passage and chamber being unnecessary, as the valve is not under pressure when it is being closed, and only requires to be balanced for unseating. To prevent the upper and lower plungers, which are actuated by two independent powers, from coming any nearer together than the thickness of the brick while the bricks are being pushed from the molds and prevent them from being crushed thereby, hardened steel rods O O O O, Figs. 30, 31, 32, 33, and 34, are inserted in the lower plunger, and also in the upper plunger, so as to be opposite each other and so as to meet just when the pressing is completed. At the same moment the toggle is released from pressure and pushed from a perpendicular by the cams. (Not shown.) These pins or rods O also aid in lifting the upper plunger and preserving their relative distance apart while the bricks are being pushed from the molds.

Figures 35, 36, 37, 38, 39, 40, 41, 42:
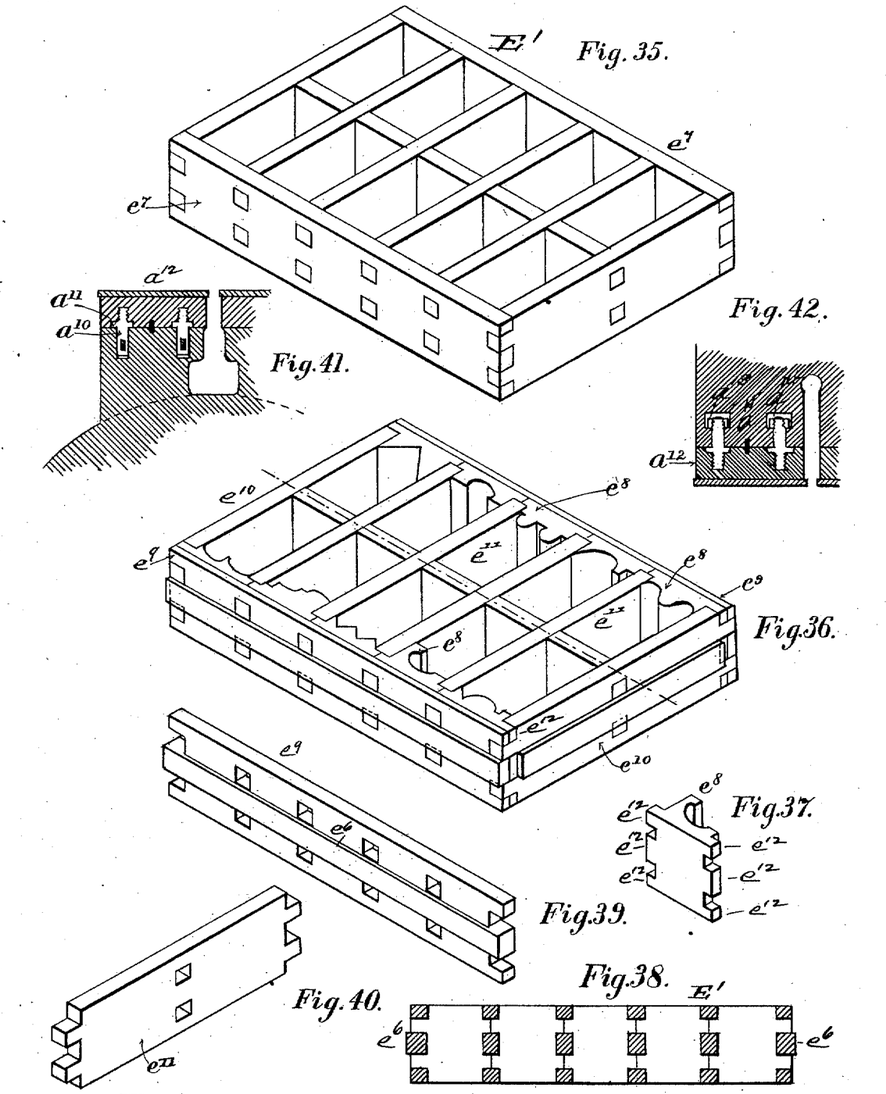
Fig. 35 is a view in perspective of the mold for common brick.
Fig. 36 is a view in perspective of the mold having the appliances used in making ornamental brick.
Fig. 37 is a view in perspective of one of the appliances shown in Fig. 36.
Fig. 38 is a central vertical section of the mold.
Figs. 39 and 40 are views, respectively, of one of the side pieces and one of the cross-pieces of the mold.
Fig. 41 is a vertical section of one of the sub-plungers of the lower plunger.
Fig. 42 is a vertical section of one of the sub-plungers of the upper plunger.

E', Fig. 35, represents an ordinary ten-brick mold, such as is in common use, and which is usually made of plates of wrought-iron put together with tenons and mortises and dovetailed at the corners, and having the inside walls faced with steel. To make molded or ornamental brick for cornices, &c., the side plates, $e^7$, are removed and short sections $e^8$ are introduced, as shown in Fig. 36. The sections at the inner end are shaped as desired, and they are held in place by the mold-frame; or, to make the same firmer, a plate, $e^9$, can be put on the outside of the sections $e^8$, (shown in Fig. 36,) and all held by the mold-frame, as previously described. The plates $e^9$, and also the plates $e^{10}$, have a projection, $e^6$, on the outside that fits into a corresponding groove in the mold-frame and block, as previously shown, and also shown in section in Fig. 38. In Fig. 40 one of the interior cross-pieces, $e^{11}$, is represented. The sections $e^8$, as shown more distinctly in Fig. 37, are provided with tongues $e^{12}$ for the purpose of interlocking with the cross-pieces $e^{11}$, as shown in Fig. 36. Thus the same mold, B', can be used in making both common and fancy brick.

Figs. 41 and 42 respectively represent a lower and an upper sub-plunger made to fit a mold such as is shown in Fig. 36. A stud-bolt with a collar, $a^{11}$, is screwed into the movable part $a^{12}$ and the whole keyed to the main plunger, or they can be fastened in the manner shown in Fig. 42, the stud-bolt being screwed into the movable part $a^{12}$, as shown, but being screwed to the main plunger by means of the nuts $a^{13}$, which, in turn, are held in the enlarged mortises $a^{14}$. The dowel-pins $a^{15}$ are for the purpose of centering the parts $a^{10}$ exactly.

I claim—

1. The combination of the plunger A, constructed to form, in conjunction with the cylinder A' and ring A³, the chamber A², with the passage $b$, the exhaust-valve B', the part C, the lever $b^2$, and the valve-stem $b^5$, substantially as described.

2. The combination of the dust-protecting part C, adapted to operate the lever $b^2$, the stem $b^5$, and the valve B', substantially as and for the purpose set forth.

3. The combination of the part C, the vertically-adjustable loop $c$, the pivoted lever $b^2$, carrying the screw $b'$, and the valve-stem $b^5$, substantially as described.

4. The combination, in a hydraulic brick-machine, of the cylinder A', the plunger A, the spring D, the nut $d'$, and the screw $d$, the spring, the nut, and screw being located within the plunger, substantially as described.

5. The combination of the cylinder A', the plunger A, and the spring D, interposed between the plunger and a support beneath the spring within the cylinder, substantially as described.

6. The combination of the cylinder A', the plunger A, and the support $d$, said plunger only when it is lowered resting, either directly or indirectly, upon said support, substantially as described.

7. The combination of the cylinder A', the plunger A, the spring D, the screw $d$, the nut $d'$, the wheels $d^2$ $d^4$, the chain $d^3$, and the shaft $d^5$, substantially as described.

8. The combination of the valve B′, the lever $b^2$, the spring $b^6$, the loop $c$, the part C, and the plunger A, substantially as described.

9. The combination of the cylinder A′, the plunger A, the chamber $A^2$, the dust-protector C, the valves B′ M, the loop $c$, the lever $b^2$, the set-screw $b'$, the passages $b$ $m^3$, the lever $m$, and the rock-shaft $m'$, substantially as described.

10. The lever $b^2$, pivoted to the bearing $b^3$ and at its ends, respectively, having a vertically-adjustable connection with the exhaust-valve stem and a part attached to the cylinder-plunger, substantially as described.

11. The combination of the plunger A and the dust-protector C, carrying the lower sub-plungers and made removable from said plunger, substantially as and for the purpose described.

12. The combination of the plunger A, the dust-protector C, the stud-bolt $c'$, and the keys $c^3$, substantially as described.

13. The mold-frame E, extended to include the opening $e'$, in combination with the mold E′ and a block for wedging the mold in its place within the mold-frame.

14. The mold-frame E, extended to the side of the machine to include the opening $e'$, to enable the mold to be moved sidewise in the mold-frame in placing it in or withdrawing it from the mold-frame.

15. The combination of the extended mold-frame made in one piece, the mold, and the block $e^3$, adapted to fit within the mold-frame and hold the mold in position, as described.

16. The combination of the extended mold-frame made in one piece, the mold, the block $e^3$, adapted to fit within the mold-frame and hold the mold in position, and the tie $e^5$, substantially as described.

17. The combination of the extended mold-frame E, the mold E′, and the block $e^3$, said mold and mold-frame being relatively shaped to enable the mold to be wedged into its bearing in the mold-frame, as described.

18. The combination of the extended mold-frame E, the mold E′, the block $e^3$, the block and mold fitting within the mold-frame, and the tightening-screws $e^4$, as described.

19. The combination of the mold-frame and molds, the plunger A, the lever $e^7$, the latch $e^{10}$, shaped as described at $e^{13}$ $e^{15}$, the spring-hook $e^{14}$, the fixed hook $e^{16}$, and the charger-bottom, substantially as described.

20. The combination of the charger, the charger-bottom, and the movable hook $e^{14}$, for engaging with a part upon the charger-bottom to move the last-named part over the molds, as described.

21. The combination of the detachable charger-bottom having the projection $e^{16}$ and the pivoted latch $e^{10}$, as and for the purpose described.

22. In a brick-press, a charger having a detachable bottom provided with a projection, such as the fixed hook $e^{16}$, as and for the purpose described.

23. The plunger A, having a vertically-adjustable screw, $e^8$, for the purpose of moving the charger-bottom-detaining mechanism, substantially as described.

24. The combination of the mold E′, the charger F, and the detachable bottom $f$, for the purpose described.

25. The combination of the plate G, carrying the plates $g'$ $g^2$, the lever $g^3$, the stem $g^7$, and the inlet-valve H, substantially as described.

26. The combination of the plate G, carrying the plates $g'$ $g^2$, the lever $g^3$, the stem $g^7$, the spring $g^8$, and the inlet-valve H, substantially as described.

27. The combination of the plate G, carrying the plates $g'$ $g^2$ and the part $g^9$, the lever $g^3$, the stem $g^7$, and the valve H, substantially as described.

28. The combination of the plate G, having the plates $g'$ $g^2$ and the part $g^9$, the lever $g^3$, the stem $g^7$, the spring $g^8$, and the valve H, as described.

29. The cam-plate G, carrying the part $g^9$, to insure the seating of the valve when the pin $g^5$ of the lever $g^3$ is opposite the interval between the plates $g'$ $g^2$, as described.

30. The combination of the charger rock-shaft $j'$, the lever $j$, the stem $j^3$, having the shoulder $j^2$, and the exhaust-valve J, as described.

31. The combination of the part C, the screw $j^4$, the arm $j^5$, the bell-crank $j^6$, the rod $j^8$, the bell-crank $j^9$, the stem $j^3$, and the valve J, as described.

32. The combination of the valve J, the stem $j^3$, the nuts $j^{12}$, the lever $l^3$, the grooved plate $l^2$, and the cam-plate L, carrying the pin $l$, as described.

33. The combination of the cam-plate L, the valve J, the valve-stem $j^3$, and the pin $l$ with the lever $l^3$ and the adjustable plate $l^2$, as described.

34. The combination of the cam-plate L, the pin $l$, the grooved plate $l^2$, the lever $l^3$, the stem $j^3$, the bell-crank $j^9$, the rod $j^8$, the lever $j$ upon the shaft $j'$, and the valve J, as described.

35. The combination of the inlet-valve M, the valve-stem and connections, the lever $m$, the rock-shaft $m'$, and the spring $m^2$, as described.

36. The combination of the valve H, the passages $h^3$ $h^4$, and the chamber $h^7$ above the valve, as and for the purpose described.

37. The combination of the valve H, balanced as described, the passages $h^3$ $h^4$, and the chamber $h^7$, as described.

38. The combination of the valve H, the ring $h^8$, the packing $h^{11}$, the plug $h^{12}$, the stem $g^7$, the packing $h^{13}$, and the plug $h^{14}$, as described.

39. The combination of the upper plunger, the lower plunger, and the stop-rods O O O O, attached directly to said plungers respectively, as and for the purpose described.

40. The mold-frame having the sections provided with tongues to adapt them to be interlocked both vertically and laterally with the mold-frame and its partitions, as described.

41. The combination of the cylinder A' and the toggle K, the water-supply to the chamber A⁴ within said cylinder being adapted to be cut off just as the toggle is to be moved from a perpendicular, as and for the purpose described.

SAMUEL E. McGREGORY.

Witnesses:
C. D. MOODY,
B. F. REX.

Correction in Letters Patent No. 362,102.

It is hereby certified that the name of the patentee in Letters Patent No. 362,102, granted May 3, 1887, for an improvement in "Brick-Machines," was erroneously written in the grant "Samuel E. M. Gregory," whereas said name should have been written *Samuel E. McGregory;* and that said Letters Patent should be read with this correction therein that the same may conform to the record of the case in the Patent Office.

Signed, countersigned, and sealed this 3d day of December, A. D. 1889.

[SEAL.]

CYRUS BUSSEY,
*Assistant Secretary of the Interior.*

Countersigned:

C. E. MITCHELL,
*Commissioner of Patents.*